INVENTOR.
EDWARD K. HINE

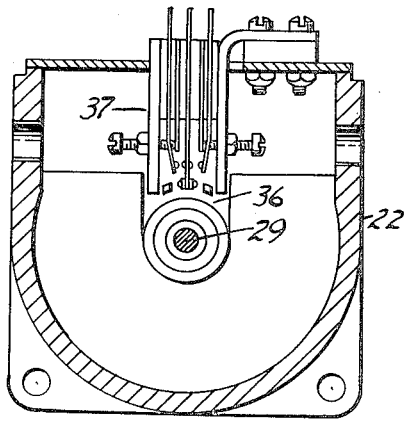
Fig. 3
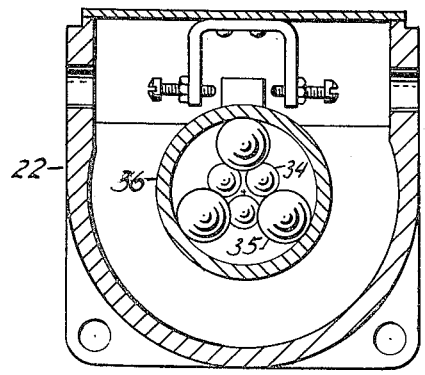
Fig. 4
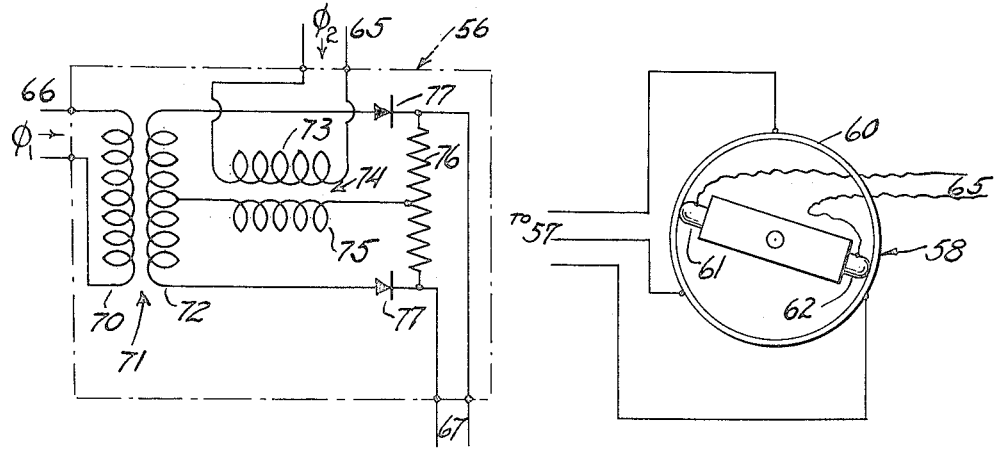
Fig. 6
Fig. 7
INVENTOR.
EDWARD K. HINE
BY
ATTORNEY.

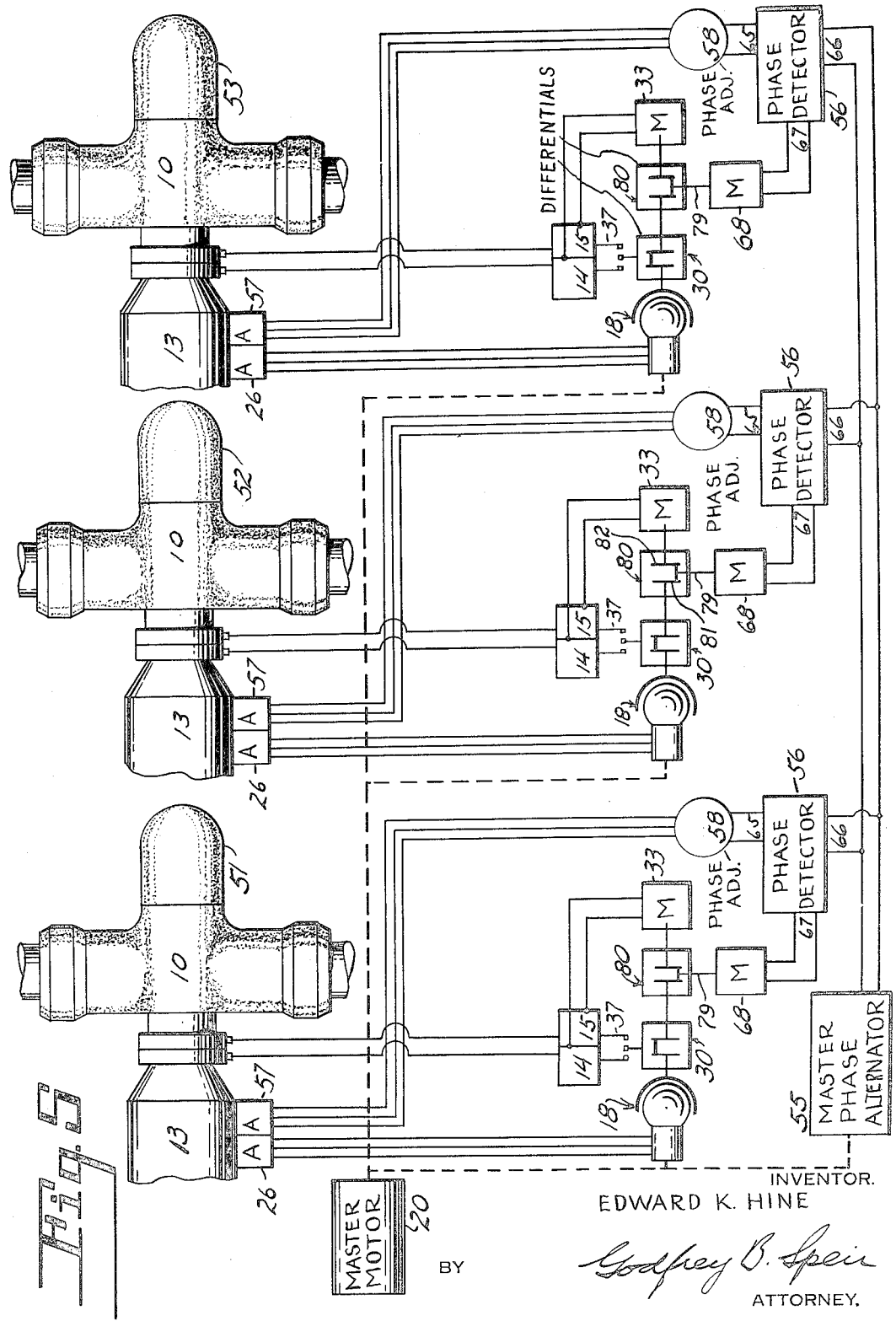

United States Patent Office 2,747,141
Patented May 22, 1956

2,747,141

SPEED CONTROL SYSTEM

Edward K. Hine, North Caldwell, N. J., assignor to Curtiss-Wright Corporation, a corporation of Delaware Application October 6, 1950, Serial No. 188,745

3 Claims. (Cl. 317—6)

This invention relates to control systems and more particularly to systems for controlling the speed of rotating machines and includes provisions which are particularly adapted for the control of the speeds of one or more aircraft power plants.

In some respects the invention includes improvements over Chillson and Brady Patent No. 2,433,432 issued December 30, 1947, and over Joseph P. Quinn Patent No. 2,541,666 issued February 13, 1951. In the Chillson et al. patent a synchronizing system is shown for a plurality of aircraft power plants, wherein the power plants are slaved as to speed control to a master speed reference comprising a constant speed electric motor. Part of the mechanisms of the Chillson et al. patent are conveniently useable in the present invention. The Quinn patent above referred to teaches a control system, as for speed control, which includes a speed error sensing system of electrical or other character and which further includes a "synthetic rate feedback" into the speed control system which compensates for the lag in the power plant and speed changing system to the end that speed change may be attained most expeditiously, within the capacity of the speed changing system, with minimization of overshoot and undershoot.

The present invention in some respects combines features of the two systems above mentioned. It further provides an electro-mechanical system for synthetic rate feedback which is very simple in construction and operation, providing a synthesized derivative control which simulates acceleration sensitivity in the speed control system. The present invention further provides means for attaining phase coordination of one or more power plants in any desired phase relationship. In this connection, the speed control is a primary control whereas the phase control is a secondary trimming control which is operationally effective only when the power plant is operating substantially at an on-speed condition.

Objects of the invention are apparent from the foregoing brief description and further objects will become apparent as the detailed description of the invention proceeds. A preferred embodiment of the invention has been selected for illustration in the drawings and for detailed description. In the drawings similar reference characters designate similar parts and Fig. 1 is a schematic diagram of a control system embodying synthetic rate feedback and applied to a single power plant;

Fig. 3 is a section substantially on the line 3—3 of Fig 2;

Fig. 4 is a section substantially on the line 4—4 of Fig. 2;

Fig. 5 is a schematic diagram showing the invention applied to a plurality of power plants and incorporating phase control;

Fig. 6 is a schematic representation of the "phase detector" unit of Fig. 5; and Fig. 7 is a diagram of the "phase adjuster" unit of Fig. 5.

Figure 1:
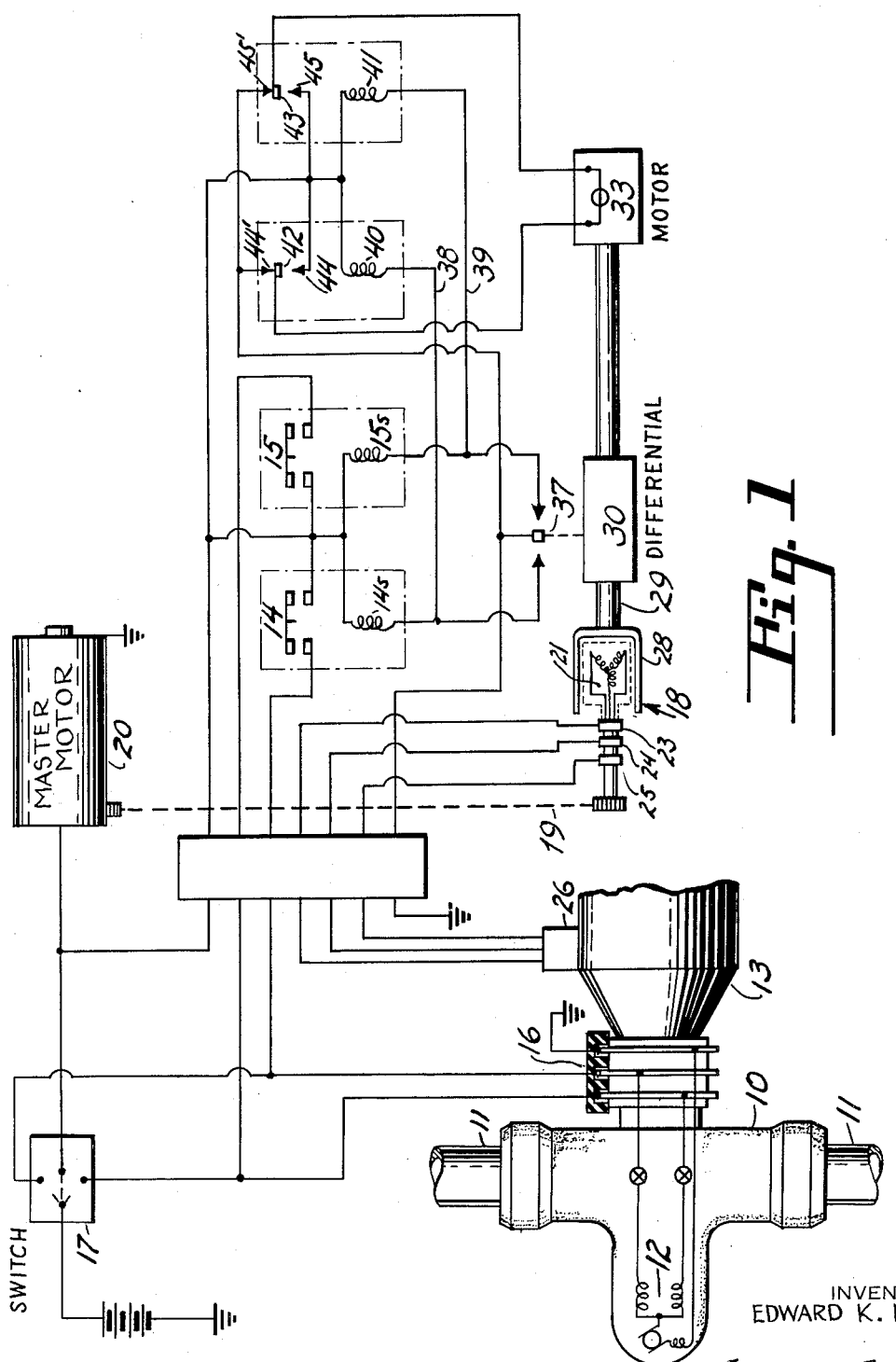
Figure 2:
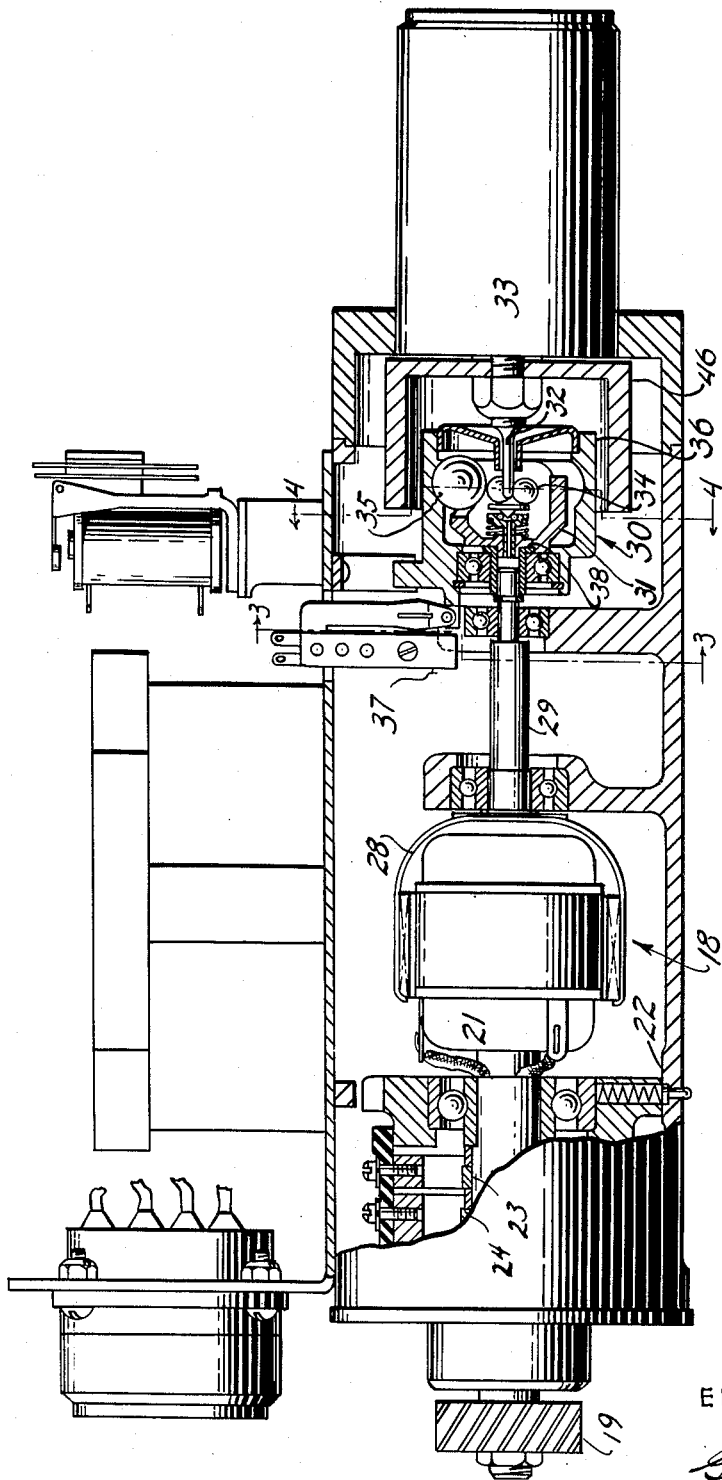
Fig. 2 is a side elevation, partly in longitudinal section, showing a differential unit utilized in the control system.

Reference may first be made to Figs. 1–4 which illustrate a control system and its components for an electromechanical synthetic rate feedback speed control system. In Fig. 1, 10 represents a propeller having variable pitch blades 11 controlled as to pitch by a reversible electric motor 12 within the propeller. The motor 12 is merely exemplary of one means of altering propeller blade pitch and any other suitable mechanism well known in the art is adapted for use in the system. The propeller is driven by an engine or prime mover 13 and speed control of the engine is afforded by altering the driven load by varying the pitch of the blades of the propeller. The motor 12 is operated by closure of either the switch 14 or the switch 15 which directs electrical power to the appropriate field winding of the motor 12 through a slip ring system 16. The switches 14 and 15 are operated by solenoids 14s and 15s by means to be described. Should manual control of the propeller be desired, a switch 17 may be utilized whereby electrical power is furnished directly, through the slip rings, to the motor field windings. In the central position of the switch 17 as shown, automatic pitch control is provided for by connecting the power source to the switches 14 and 15.

To cause the engine 13 to operate at a precise desired speed, engine speed is compared to reference speed through an electro-mechanical differential 18, this differential being mechanically driven through a connection 19, by a master speed reference motor 20. The differential 18, shown in greater detail in Fig. 2, comprises a rotor 21, borne in a housing 22, and carrying three-phase windings connected to slip rings 23, 24 and 25. The slip rings are connected in turn to a three-phase alternating current generator 26 driven by the power plant 13. Through these means, a rotating field is set up in the windings of the rotor 21, rotating at a speed corresponding to engine speed. The rotor is mechanically driven by the master motor 20 in the opposite direction so that if the power plant and rotor 21 speeds are matched, the rotating field of the rotor 21 stands still in space. If a speed error exists in either direction, the field rotates in one direction or the other at an R. P. M. corresponding to the speed error.

Embracing the rotor 21 is a drag cup 28 which, when the engine is on speed, stands still, but which, when the engine is off speed, rotates in one direction or the other being dragged by the field surrounding the rotor 21. Thus, a shaft 29 supporting the drag cup 28 is stationary when the engine is on speed and rotates in either direction at a speed proportional to an off speed. The mechanism thus far described is similar to that shown in Chillson et al. Patent No. 2,433,432.

The shaft 29 is drivably connected to a speed reducing mechanical differential 30 and specifically to a ball cage 31 thereof which constitues one of the input members of the differential. Another input member of the differential 30 is a stem 32 which is driven by an electric motor 33. The stem 32 is surrounded by and in contact with a row of balls 34 engaging a set of balls 35 which in turn engage an outer race member 36 which constitutes the output member of the speed reducing differential. This ball type speed reducing differential is described more fully in a copending application of Edward K. Hine and William E. Burns, Serial No. 186,801 filed September 26, 1950 now Patent No. 2,703,992, issued March 15, 1955.

In the present speed control system, the motor 33 and the shaft 29 provide inputs to the differential 30 and if there is a speed error sensed by the shaft 29, while the motor 33 is stationary, the output members 36 will rock on its axis to close certain switch elements embodied in a switch unit 37. As shown in Fig. 4, the ball differential 30 includes positive stops for the output members 36, the differential incorporating a slip clutch at 38 should there be a tendency for continuous rotation of the output member 36. As shown in Fig. 1 the differential operated switch 37 may close a circuit to the solenoid 14s or to the solenoid 15s depending upon the sense of the speed error, thereby closing switch 14 or switch 15 to initiate pitch change in the propeller 10. Concurrently as the solenoids 14s or 15s are closed, through connections 38 and 39, solenoids 40 or 41 are energized serving respectively to close switches 42 or 43 against switch points 44 or 45. Closure of switches 42 or 43 energizes the reversible motor 33 in one direction or the other, serving to rotate the stem 32 of the ball differential 30. If desired, the switches 14 and 42, and 15 and 43, may be ganged and operated by a single solenoid for each pair.

The motor 33, which may now be termed the rate motor, is of special construction to yield starting and stopping lag characteristics which resemble the starting and stopping lag characteristics of the speed changing system as a whole. In this connection, when a speed change is demanded of the propeller 10, the inertia of the propeller and of the power plant creates a certain lag. In addition to this, there is a lag in the pitch changing system proper. That is, when the motor 12 is energized, a certain built-up time is required before the motor delivers full torque to effect changes in pitch of the propeller blades. The two lags—that due to the inertia of the power plant and that due to the pitch changing system itself—are simulated in the motor 33 by the inertia built into said motor. The lag may be created in part by a flywheel 46 on the motor shaft, the inertia of the rotating system giving the motor the primary required time constant. A secondary time constant may also be incorporated in the electrical characteristics of the motor. Stopping lag of the motor 33 is controlled by dynamic braking wherein the motor windings are short circuited when the switches 42 and 43 are relaxed, through closure upon switch points 44' and 45'.

Under conditions where the pitch changing system 12 is operating at full speed in attempting to change propeller pitch to correct a substantial power plant speed error, there exists a steady state lag in the power plant system represented by a speed difference between the instant actual speed of the power plant and an instant final speed. The latter is the speed which would be reached by the power plant if pitch change were stopped at the instant of said speed determination. This speed difference, which may be termed a steady state lag, remains more or less constant over a wide range of operating conditions and for one exemplary arrangement may be of the order of 200 R. P. M. To secure optimum correction by the speed control system, the rate motor 33 may be designed to have a full R. P. M. equal to the steady state lag, or, 200 R. P. M. for the example used. The starting and stopping lag characteristics of the motor will be designed to simulate the corresponding lags in the propeller system in building up to or decaying from full available rate of pitch change of the propeller. It is more convenient however to utilize a rate motor 33 having higher R. P. M. than the steady state lag, such as 200 R. P. M., so to this end, the differential speed reducer 30 is utilized. The ratio of this unit may be selected to fit any designed situation; in the example shown, there is a reduction ratio between the stem 32 and the outer race 36 of twenty to one. Thus, the rate motor 33 may have a maximum R. P. M. of twenty times two hundred or 4,000 R. P. M. whereby the motor 33 may be made light in weight and small in bulk, still, however, attaining the desired starting and stopping lag characteristics analogous to those of the power plant speed changing system.

When the speed error shaft 29 starts to rotate, as previously mentioned, the switch 37 is closed to energize the pitch changing system and concurrently, the rate motor 33 is energized to follow up on the speed error at substantially the same rate at which the speed error occurs thus tending to open the switch 37 should the rate motor 33 overrun the speed error shaft 29. As soon as the speed error shaft 29 relaxes in speed, by virtue of partial correction of the speed error, the rate motor 33 opens the switch 37 through the differential and cuts off the current supply to the speed changing system. There will be a lag after speed changer energization is stopped before the propeller reaches an on-speed condition. This lag has its counterpart in the stopping characteristics of the rate motor 33 so that, under optimum conditions, the switch 37 will remain open and the power plant will quickly drift into the on-speed condition without further pitch correction. Should the lag condition of the propeller and its pitch changing mechanism vary for any reason, from that established in the rate motor 33, the switch 37 will close to initiate either pitch increase or pitch decrease with corresponding energization of the rate motor 33 in the proper direction and thus will provide a short pulse of pitch change correction, the switch 37 opening almost immediately, to bring the power plant to the on-speed condition expeditiously.

Should the R. P. M. error be of small magnitude, small enough so that full rate of pitch change is unnecessary to correct it, pitch change will initiate concurrently with operation of the rate motor 33 so that the lag in the power plant and the lag in the rate motor will remain substantially in step until one overruns the other to open the switch 37 prior to expiration of the time interval required for the rate of pitch change to assume maximum value.

The curves representing the characterictics above described are fully shown and described in Quinn patent No. 2,541,666 issued February 31, 1951. In fact, the Quinn patent secures the same effective result as is secured by the apparatus of the present invention but by a different means. The Quinn patent utilizes electrical circuits involving inductance-capacitance delay elements while the present invention utilizes electro-mechanical means. The ultimate effect in the two systems is the same.

The system just described may readily be utilized in the synchronization of a plurality of power plants as shown in Fig. 5 and the essential elements of Fig. 1 are repeated in more schematic form in Fig. 5. In Fig. 5 however a further refinement has been added to attain phase synchronization between several power plants. This phase synchronization is desirable at times to enable a plurality of power plants to run together not only at constant speed but also in perfect phase relation with one another. In an aircraft application for instance there may be two or more power plants each driving its own propeller. Each propeller has a plurality of blades and to improve performance and to minimize vibration in the system it may be desirable to have specific blades of each of the several propellers in certain angular phase relation to one another under conditions of steady state operation. For instance, the three power plants may each be equipped with a propeller, and reference blades in the propellers may respectively be considered as *a*, *b* and *c*. It may be desirable, for optimum operation and minimum vibration, to have all of blades *a*, *b* and *c* in precise phase with one another. Alternatively it may be more beneficial to have a specific angular displacement between blades *a* and *b*, *a* and *c* and *b* and *c*. By the provisions of this invention, the desired phasing of the power plants and of their propellers may be secured, such phasing being adjustable according to requirements which may come into being.

In Fig. 5 I show power plants 51, 52 and 53, each such power plant including a propeller 10 and an engine 13, and control elements such as shown in Fig. 1. However, the master motor 20 like that in Fig. 1, serves all of the differential speed control devices for the several power plants.

The phase detection and control between the several power plants is accomplished by a master phase alternator 55 for all power plants, this comprising a generator which conveniently may be driven by and at uniform speed proportional to that of the master motor 20. Alternatively, the alternator 55 may be driven by one of the power plants, other power plants being phase-slaved to it. The single phase output of the master alternator is fed to a phase detector 56, there being one such phase detector for each of the power plants 51, 52 and 53. The phasing system for each power plant is the same so a description of one will suffice for all. The engine 13 drives a phasing alternator 57 preferably comprising a two-pole three-phase machine driven at one half of propeller speed. These characteristics are chosen so that a single half wave output of the alternator will embrace 360° of propeller revolution, enabling, as will become apparent shortly, the selection of any phase angle desired for propeller operation. The alternator 57 output is connected to a phase adjuster 58 having a single phase output connected to the phase detector 56. The adjuster 58 may be of any desired type such as a rotary transformer or a differential device such as a Selsyn or Autosyn unit.

This device may comprise, as shown in Fig. 7, a resistance ring 60, the three leads from the alternator 57 being connected thereto at equi-distant points. Within the ring 60 is an adjusting device including two contacts 61 and 62, diametrically opposed, and carried on an arm adjustable angularly within the ring 60. The output leads from the adjusted are led from the two contacts 61 and 62 and yield a single phase current having a phase relation to the output of the alternator 57 depending upon the angular adjustment of the points 61 and 62 in the ring 60.

The phase detector 56 may be any suitable device to compare the two inputs 65 and 66 from the phase adjuster 58 and from the master phase alternator 55 respectively, the detector providing a D. C. output 67 of proper polarity and E. M. F. in accordance with the phase angle between the input 65 and the input 66. The phase detector may comprise any suitable circuit system to compare two phases and to produce an output proportional to the phase angle therebetween. Such a circuit arrangement is shown in Fig. 6 by way of example wherein one phase input connects to the primary 70 of a transformer 71, the latter having a center tapped secondary 72. The second phase input feeds a primary 73 of a transformer 74 whose secondary is connected at one end to the center tap of the secondary 72. The outer leads of the secondary 72 are connected to the ends of a load resistor 76 through rectifiers 77. The free end of the secondary 75 is connected to the center of the load resistor 76. The output voltage of the circuit, from the ends of the resistor 76, will be a function of the phase displacement between the inputs 65 and 66. To provide required output energy, the phase detector output 67 may, if desired, be connected to a linear amplifier whose output leads to the phase motor 68 now to be described.

The output 67 of the phase detector feeds a reversible D. C. motor 68 whose characteristics are chosen to have a speed dependent upon voltage input and a maximum R. P. M. much less than that of the rate motor 33. The motor 68 drives a pinion or element 79 of any suitable small differential 80, the other two elements of the differential, 81 and 82, being connected as shown to the stem 32 of the differential 30 and to the rate motor shaft respectively. The differential 80 may, if desired, be located in another part of the system, for instance between the speed error shaft 29 and the cage 31 of the differential 30.

If and when a phase error exists between the master phase alternator 55 and the propeller 10, or if there is an error in the phase angle as preset by the adjuster 58, this error is injected, in terms of a speed error, in the speed control system. The differential 80, even though the power plant may be on-speed, may inject a phase error signal into the system, closing the switch 37 to produce a speed corrective pulse. If this pulse is adequate to correct phase, the engine alternator 57 will respond and will stop the phase motor 68 through balance of phase angles in the phase detector 56.

It is to be noted that the phase correction system above described is a secondary trimming control on the speed control system and is so designed as to produce minor speed corrective impulses ancillary to the speed corrections afforded by the differential 18 in cooperation with the rate motor 33. Should an off-speed exist, there will inevitably be an accompanying phase error. The phase sensing system will crank this error into the speed correcting system but the phase error magnitude will be very small compared with the speed error signal. The speed error will effect, through the system, a speed change to bring the engine to an on-speed relation to the master motor 20 but may bring this on-speed condition into being without phase correction of the propeller. Thereupon, the phase angle error detection will become significant, energizing the phase motor 68 to a degree sufficient to advance or retard the propeller, within one revolution thereof, to proper phase relation with the master phase alternator 55.

The phase adjustment system herein described may be used in other types of speed control systems. For instance, the phase adjusting system need not necessarily be used with a synthetic feedback system. It could be used with any governing or synchronizing system which is sufficiently sensitive and precise in operation to hold a system or power plant at constant speed or at a constant state of operation.

In the speed error sensing system, an inversion of components is considered to be within the scope of the invention. For instance, referring to Fig. 1, the rotor 21 can be driven at a function of propeller speed and the windings thereon energized by a constant speed (adjustable) alternator to provide the speed datum. Also, the units 18, 30, 33 and related equipment may be embodied in the propeller assembly with which they are functionally associated.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In a powerplant control system, a unit having an output element movable in accordance with the error in speed between actual powerplant speed and a desired powerplant speed, a phase reference means establishing a desired rotational relationship for said powerplant, and producing a phase reference signal, means to sense the instant rotational position of said powerplant producing an actual phase signal, means connected to said reference means and sensing means and actuated by their signals producing a phase error signal, a motor connected to said latter means and operated by the phase error signal therefrom, a mechanical differential having one input element connected to and driven by said motor, a second input element connected to and driven by said unit output element, said differential having an output member, and a powerplant speed control mechanism connected to and actuated by said differential output member.

2. In a powerplant control system according to claim 1, means connected to said sensing means adjustable to change the zero phase error relationship between said phase reference signal and said actual phase signal.

3. In a powerplant control system, a control element movable according to the divergence of actual powerplant speed from a desired speed, a phase reference means establishing a desired rotational relationship of said powerplant, means to sense the error in phase between the phase setting of said reference and the actual phase of said powerplant, a motor connected to said sensing means and driven in direction and amount according to the phase error, a differential having one input element connected to and driven by said movable control element, a second input element connected to and driven by said motor, said differential having an output member, and a powerplant speed control mechanism connected to and actuated by said differential output member.

References Cited in the file of this patent
UNITED STATES PATENTS

| | | |
|---|---|---|
| 2,302,042 | Martin | Nov. 17, 1942 |
| 2,399,685 | McCoy | May 7, 1946 |
| 2,431,687 | Drake | Dec. 2, 1947 |
| 2,514,178 | Chilman et al. | July 4, 1950 |
| 2,517,703 | Offner | Aug. 8, 1950 |
| 2,543,077 | Treseber | Feb. 27, 1951 |
| 2,551,306 | Wisman | May 1, 1951 |